United States Patent
Bui et al.

(10) Patent No.: US 11,625,540 B2
(45) Date of Patent: Apr. 11, 2023

(54) ENCODER, SYSTEM AND METHOD FOR METAPHOR DETECTION IN NATURAL LANGUAGE PROCESSING

(71) Applicant: Vinai Artificial Intelligence Application and Research Joint Stock Company, Ha Noi (VN)

(72) Inventors: Hung Hai Bui, Ha Noi (VN); Thien Huu Nguyen, Ha Noi (VN); Duong Minh Le, Ha Noi (VN)

(73) Assignee: Vinal AI Application and Research Joint Stock Co, Ha Noi (VN)

( * ) Notice: Subject to any disclaimer, the term of this patent is extended or adjusted under 35 U.S.C. 154(b) by 200 days.

(21) Appl. No.: 17/160,103

(22) Filed: Jan. 27, 2021

(65) Prior Publication Data
US 2021/0271822 A1 Sep. 2, 2021

(30) Foreign Application Priority Data
Feb. 28, 2020 (VN) .............................. 1-2020-01159

(51) Int. Cl.
| G06F 40/30 | (2020.01) |
| G06F 40/279 | (2020.01) |
| G06N 3/08 | (2023.01) |
| G06F 40/205 | (2020.01) |
| G06N 3/044 | (2023.01) |
| G06N 3/045 | (2023.01) |

(52) U.S. Cl.
CPC ............ *G06F 40/30* (2020.01); *G06F 40/205* (2020.01); *G06F 40/279* (2020.01); *G06N 3/044* (2023.01); *G06N 3/045* (2023.01); *G06N 3/08* (2013.01)

(58) Field of Classification Search
CPC ...... G06F 40/30; G06F 40/279; G06F 40/205; G06N 3/0445; G06N 3/0454; G06N 3/08
See application file for complete search history.

(56) References Cited

U.S. PATENT DOCUMENTS

| 2020/0160154 A1* | 5/2020 | Taslakian | G06N 3/08 |
| 2020/0293874 A1* | 9/2020 | Ji | G06N 5/04 |
| 2021/0256355 A1* | 8/2021 | Chen | G06N 20/00 |

OTHER PUBLICATIONS

Sun et al. "BiLSTM-Based Models for Metaphor Detection" National CCF Conference on Natural Language Processing and Chinese Computing. Springer, Cham, 2017. (Year: 2017).*

\* cited by examiner

*Primary Examiner* — Bhavesh M Mehta
*Assistant Examiner* — Edward Tracy, Jr.
(74) *Attorney, Agent, or Firm* — United One Law Group LLC; Kongsik Kim; Jhongwoo Peck

(57) ABSTRACT

Provided is an encoder, system and method for metaphor detection in natural language processing. The system comprises an encoding module configured to convert words included in a sentence into BiLSTM representation vectors; a first encoder configured to generate a first entire representation vector of a WSD resolving task; a second encoder configured to generate a second entire representation vector of an MD task; and a multi-task learning module configured to perform knowledge transfer between the first and second encoders. Wherein, each of the first and second encoders includes a graph convolutional neural network (GCN) module configured to encode a link between a target word and a core word to generate GCN representation vectors; a control module configured to regulate the GCN representation vectors to generate an entire representation vector.

14 Claims, 6 Drawing Sheets

ENCODER, SYSTEM AND METHOD FOR METAPHOR DETECTION IN NATURAL LANGUAGE PROCESSING

CROSS REFERENCE TO RELATED APPLICATION

This application claims priority to Vietnamese Patent Application No. 1-2020-01159 filed on 28 Feb. 2020, which application is incorporated herein by reference in its entirety.

TECHNICAL FIELD

Embodiments of the present invention relate to an encoder, system and method for metaphor detection in natural language processing.

RELATED ART

Metaphorical expression is a persuasive means for everyday communication and can provide vividness and clarity for human thoughts and information exchange.

At the cognitive level, the metaphorical expression can aid in conceptualization of human specific experiences in the real world and in transfer of the conceptualized knowledge to other areas. More specifically, the metaphorical expression can be explained as a phenomenon in which a systematic metaphorical association exists between two different concepts and/or domains established in human cognition and presented in language.

Detection of metaphorical expression has become a significant problem in the field of natural language processing (NLP) due to the ubiquity of metaphor. Correct recognition of metaphorical expression has a significant impact on text comprehension ability of NLP systems for various purposes (e.g., information extraction, opinion discussion, and machine translation). However, the detection of metaphorical expression is a difficult problem in which the systems should understand a literary meaning of the metaphorical expression in a particular text and distinguish between the literary meaning and a non-literary meaning on the basis of analogical comparison.

Rule-based learning systems and machine learning systems are being used as initial tasks to detect text for detection of metaphorical expression. Further, recently, deep learning techniques and representative word expression techniques are being applied to the detection of metaphorical expression.

SUMMARY

The present invention is directed to providing a system and method for identifying metaphorical expressions and words in text.

The present invention is also directed to providing a system and method for detecting metaphorical expression with high accuracy using deep learning.

According to a first aspect of the present invention, there is provided an encoder for metaphor detection in natural language processing (NLP) comprising: a graph convolutional neural network (GCN) module configured to encode a link between a target word and a core word to generate GCN representation vectors; a control module configured to regulate the GCN representation vectors to generate an entire representation vector.

The GCN module, in order to encode the link between the target word and the core word, feeds BiLSTM representation vectors into a graph convolutional neural network (GCN) structured to compute over a dependency tree of an input sentence.

The control module, in order to regulate the GCN representation vectors, applies an activation function (e.g., a rectified linear unit (ReLU)) to the BiLSTM representation vector of the target word to generate a BiLSTM control vector and a GCN control vector, respectively; applies the BiLSTM control vector and the GCN control vector to the BiLSTM representation vectors and the GCN representation vectors via an element-wise multiplication to generate filtered BiLSTM vectors and filtered GCN vectors, respectively; and aggregates the filtered GCN vectors to generate the entire representation vector.

The encoder further includes a feed-forward neural network using the entire representation vector as an input and calculating a probability distribution on whether the target word is a metaphorical expression or a non-metaphorical expression using a softmax layer, wherein a loss function for training is a negative log-likelihood function for a learning dataset.

According to a second aspect of the present invention, there is provided a system for metaphor detection in natural language processing comprises an encoding module configured to convert words included in a sentence into BiLSTM representation vectors, a first encoder configured to generate a first entire representation vector of a WSD resolving task, a second encoder configured to generate a second entire representation vector of an MD task, wherein the first and second encoders have the same network architecture as the encoder of the first aspect of the present invention, a multi-task learning module configured to perform knowledge transfer between the first and second encoders.

The encoding module, in order to convert the words included in the sentence into the BiLSTM representation vectors, concatenates vectors calculated by using an uncontextualized pre-trained word embedding, a contextualized word embedding, and an index embedding into a concatenated vector, and executes a BiLSTM network over the said concatenated vector to generate the BiLSTM representation vectors.

The multi-task learning module comprises a task-specific classifier configured to compute a probability distribution for possible labels for each task.

The multi-task learning module minimizes the following loss function:

$$C(w^t, p^t, y^t) = -\log P^t(y^t|w^t, p^t) + \lambda \|V^{wsd} - V^{md}\|_2^2$$

in order to update parameters to the task-specific classifier and the first and second encoders.

An alternative training process is used to train the system.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
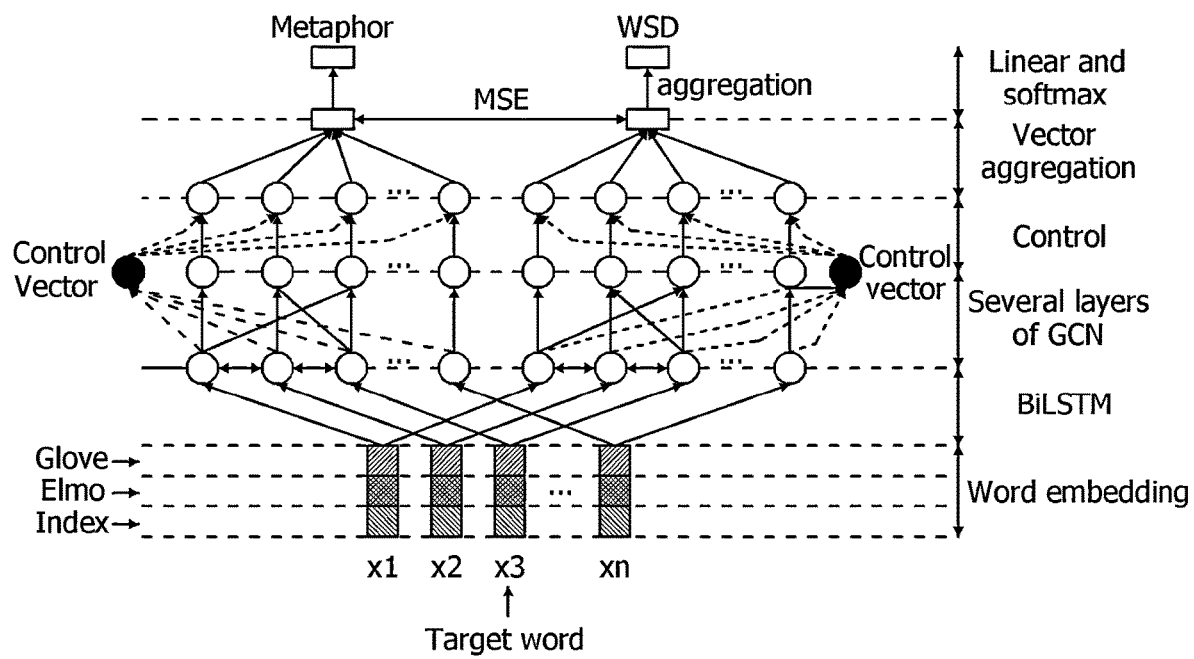
FIG. 1 is a conceptual diagram of a system for metaphor detection in natural language processing according to an embodiment.

Hereinafter, exemplary embodiments of the present invention will be described in detail. However, if it is determined that a detailed description of well-known functions or configurations related to the invention unnecessarily obscures the subject matter of the invention in the description of embodiments, the detailed description will be omitted. Also, sizes of elements in the drawings may be exaggerated for explanation and do not refer to actually-applied sizes.

In embodiments, when a sentence is given, it may be determined whether each word included in the sentence is a target word for metaphor detection (MD) using a binary classification problem.

In the embodiments, the term "$w=w_1, w_2, \ldots, w_n$" may denote a sentence having a length n, and $w_a$ (here, a=1, 2, 3, ..., n) may denote the target word for MD.

Further, in the embodiments, the target word for MD may be referred to as a target word or a word of interest.

In addition, important context words, which are more important than the other context words with respect to their contribution to the determination about metaphor for the target word, may be referred to as core words or associated words.

Figure 2:
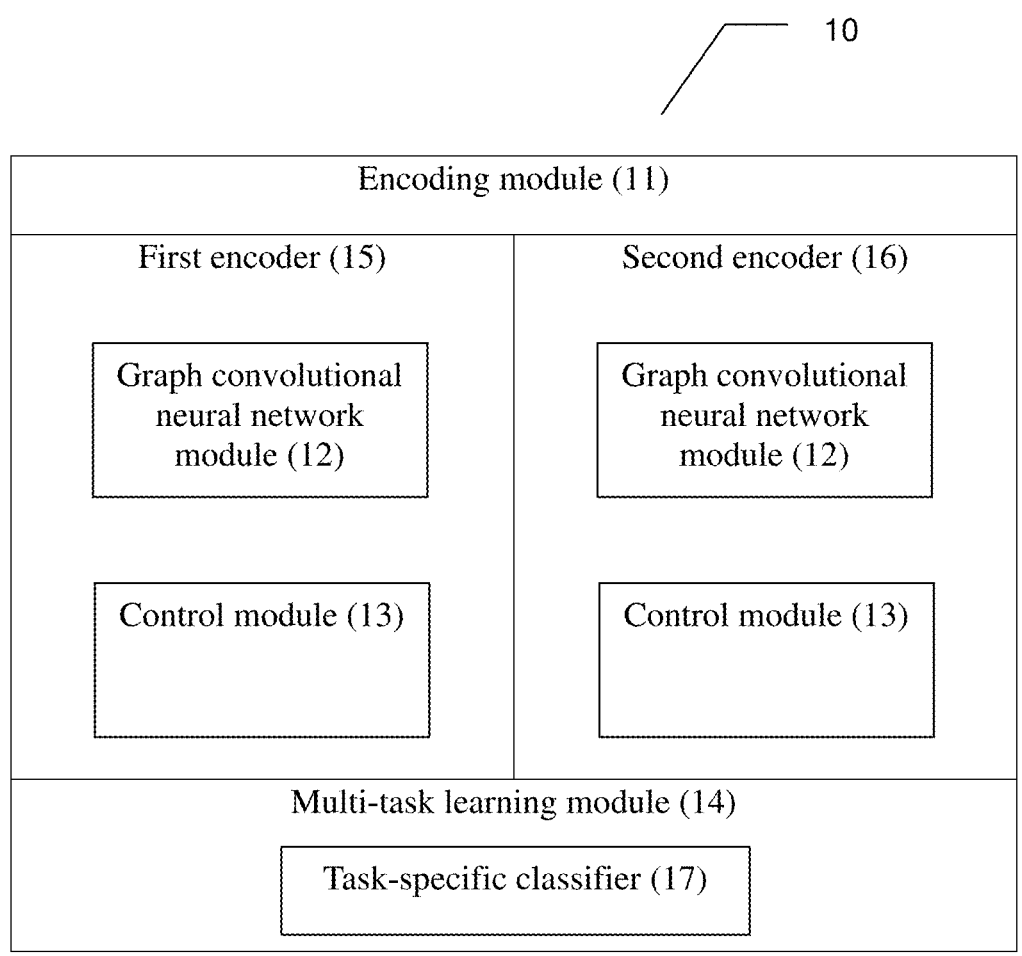
FIG. 2 is a block diagram of a configuration of a system for metaphor detection in natural language processing according to an embodiment.
Figure 3:
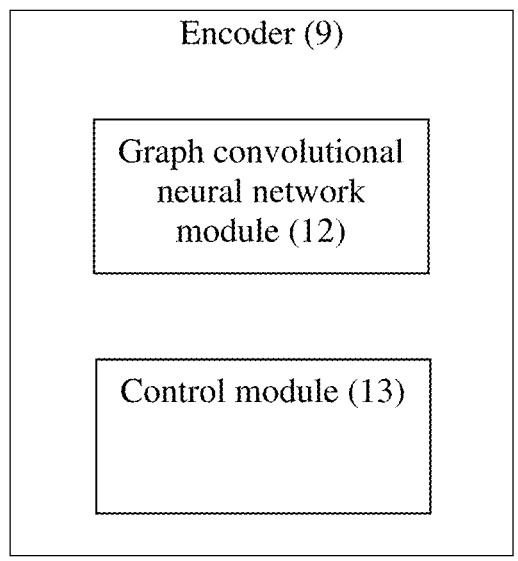
FIG. 3 is a block diagram of a configuration of an encoder for metaphor detection in natural language processing according to an embodiment.

FIG. 1 is a conceptual diagram of a system for metaphor detection in natural language processing according to an embodiment, FIG. 2 is a block diagram of a configuration of the system for metaphor detection in natural language processing according to the embodiment, and FIG. 3 is a block diagram of a configuration of an encoder for metaphor detection in natural language processing according to the embodiment.

Referring to FIG. 3, in the embodiment, an encoder 9 for metaphor detection in natural language processing (NLP) may comprise a graph convolutional neural network (GCN) module 12 configured to encode a link between a target word and a core word to generate GCN representation vectors; a control module 13 configured to regulate the GCN representation vectors to generate an entire representation vector.

Referring to FIGS. 1 and 2, in the embodiment, a system for metaphor detection in natural language processing (NLP) 10 may comprise an encoding module 11 configured to convert words included in a sentence into BiLSTM representation vectors, a first encoder 15 configured to generate a first entire representation vector of a WSD (Word Sense Disambiguation) resolving task, a second encoder 16 configured to generate a second entire representation vector of an MD (Metaphor Detection) task, wherein the first and second encoders 15 and 16 may have the same network architecture as the encoder 9 in FIG. 3, a multi-task learning module 14 configured to perform knowledge transfer between the first and second encoders 15 and 16.

The encoding module 11 may convert words included in a sentence w into a real-value vector for a deep learning architecture. In an embodiment, the encoding module 11 may convert words included in a sentence into BiLSTM representation vectors.

The encoding module 11 may convert each of the words included in the sentence into the vector using an uncontextualized pre-trained word embedding, a contextualized word embedding, and an index embedding.

For example, the encoding module 11 may convert each word $w_i$ ($w_i \in w$) into a vector $x_i$ by concatenation of the vectors calculated by using the following three embeddings.

A first vector may refer to a vector generated by an uncontextualized pre-trained word embedding of word $w_i$ from Global Vectors (GloVe) for Word Representation. The encoding module 11 may search an embedding table provided by GloVe for the first vector.

A second vector may refer to a vectors generated by a contextualized word embedding of a word $w_i$ from Embeddings from Language Model (ELMo). The encoding module 11 may execute the pre-trained ELMo model over the input sentence to generate three hidden vector sequences for words in the sentence. In this case, each of the sequences may correspond to a layer of the ELMo architecture. Thereafter, the encoding module 11 may calculate the weighted sum of the hidden vectors at a location i of each sequence in order to generate a cumulative representation vector for the word $w_i$. The weights of the respective sequences and scalar parameters of ELMo may be learned in the training process of the entire model.

A third vector may refer to a vector generated by an index embedding. In the vector generated by the index embedding, in order to specify that a word $w_a$ is a word of interest in MD, a binary indicator $b_i$ may be assigned. When i=a, the binary indicator $b_i$ may be assigned to one, otherwise, the binary indicator $b_i$ may be assigned to zero. Thereafter, the binary indicator $b_i$ may be mapped to a real-value vector using an index embedding table that is randomly initialized and fixed during training.

The encoding module 11 may convert the sentence w into a series of real-value vectors $x=x_1, x_2, \ldots, x_n$ using the above-described three vectors.

In an embodiment, due to a characteristic of a bidirectional long-short term memory (BiLSTM) network, components of the second vector may be useful for encapsulating contextual information of the whole sentence into each vector $x_i$. However, components of the first vector are independent of components of the third vector, and the components of the first vector and the components of the third vector are not well integrated with the components of the second vector in order to form fully contextualized and rich representation vectors for the words in the input sentence.

Therefore, in order to efficiently combine three vector components of the vector $x_i$, the encoding module 11 may execute a BiLSTM network over a vector sequence $x_1, x_2, \ldots, x_n$ and generate a hidden vector sequence $h=h_1, h_2, \ldots, h_n$. The hidden vector sequence may be used as a BiLSTM representation vector.

Due to recurrent and bidirectional characteristics of the BiLSTM network, the contextual information throughout the entire sentence x in each vector $h_i$ may be encoded and the other components of the vector $x_i$ may be smoothly wrapped into a single contextualized expression space.

The GCN module 12 may encode a link between a target word and a core word to generate GCN representation vectors.

The GCN module 12 may use a GCN with a dependency parsing tree of the sentence to directly link the target word to a contextually core word for MD. Here, the GCN may propose a new control mechanism for filtering a representation vector which is trained in order to maintain the most significant information for MD.

In an embodiment, the dependency parsing tree may refer to data obtained by graphing a link relationship between the words included in the sentence.

The GCN module 12 may perform modeling on core words in text. When a word of interest, which is a target for detection of metaphorical expression, is provided in text, some words may be core words for MD of the word of interest, whereas other words may be words that are not significant for MD.

Figure 6:
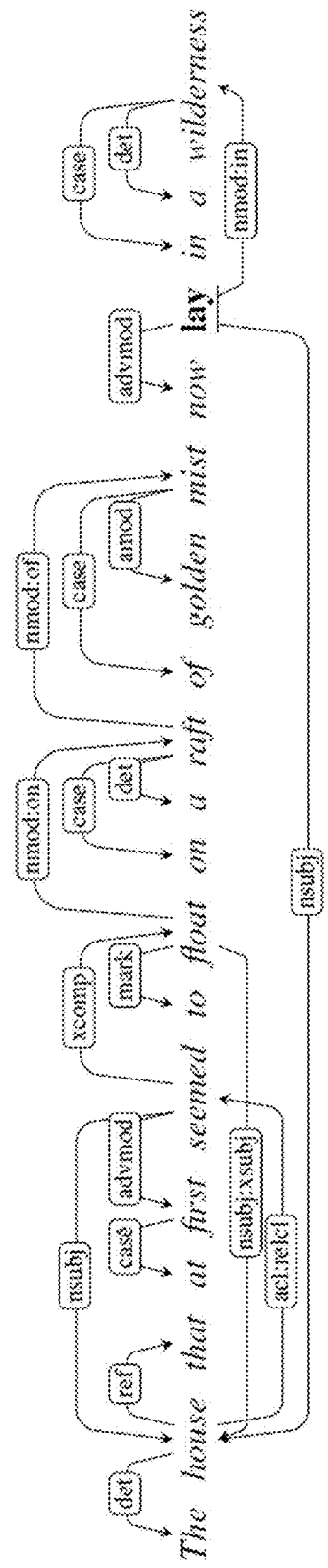
FIG. 6 is an example sentence for explaining the embodiment.

For example, in an example sentence of FIG. 6, a word "house" may be a core word for detecting a metaphor of a word "lay" that is a word of interest. This is because the word "lay" is generally used for a living animal instead of a static object such as a house.

On the other hand, other words (e.g., "seemed," "float," "mist," and the like) may be words that are not significant for MD and may be recognized as noise in an expression learned by a deep learning model. In the present invention, the core word may be detected by performing calculation of the GCN for MD on the basis of the dependency parsing tree of the sentence.

In an embodiment, a link between a head word and a modifier may associate with the core word and the word of interest, that is a target word for MD. For example, in the example sentence of FIG. 6, the core word "house" may be located next to the word "lay" that is a word of interest syntactically by an "$n_{subj}$" relationship. In the GCN performed on the dependency structure, a representation vector for a word in one stage may be calculated based on a representation vector of a syntactically adjacent word in a previous stage. As a result, the representation vector for the word of the GCN may include information of the core word for MD in the sentence. Accordingly, unassociated words, excluding the core word and the word of interest, may be filtered and performance of the model may be potentially improved. Further, by providing a customizing function for the GCN representation vector so as to classify a single word or a single expression in the sentence at a time in order to detect a metaphor, only information associated with the word of interest may be maintained and propagated over the next computation step. Specifically, a control vector generated from the representation vector of the word of interest may be used as a filter of the GCN vector for performing MD.

When the GCN module 12 receives the hidden vectors from the encoding module 11, the GCN module 12 may use the hidden vectors to calculate GCN representation vectors for MD. In this case, the GCN module 12 may recognize the core word which is contextually associated with the target word.

As described above, a process of recognizing the core word is not currently implemented on the BiLSTM network. Therefore, the GCN module 12 may feed the hidden vectors (i.e., BiLSTM representation vectors) $h_i$ into the GCN structured to calculate based on the dependency parsing tree of the input sentence w.

The calculation of the GCN requires a adjacency matrix A to encode the link of the words in the dependency parsing tree for the vector x. The GCN module 12 may add a reverse edge and a self loop to the tree in addition to the inherent direct link of the dependency parsing tree in order to provide the adjacency matrix. The added reverse edge may enable the core word of the word w and the word $w_i$ itself in the dependency parsing tree to contribute to the calculation of the GCN representation vector for the word w via a convolution operation. The added reverse edge helps enrich the GCN representation vector with context which is syntactically significant to improve performance of MD.

The GCN module 12 may include a multilayer convolution. Each layer may use a matrix $H_i (i \geq 0)$ of a previous layer i as input to compute matrix $H_{i+1}$ on a current layer based on Equation 1 below.

$$H_{i+1} = g(AH_i W_i^g) \qquad \text{[Equation 1]}$$

In Equation 1, $H_0=[h_1, h_2, \ldots, h_n]$ may denote a matrix whose rows are the hidden vectors from the BiLSTM generated by the encoding module 11. Further, $W_i^g$ may denote a weight matrix of an $i^{th}$ layer and g may denote a nonlinear function.

The GCN module 12 may optimize the number of layers of the GCN module 12 on the basis of a validation dataset using Equation 1.

Hereinafter, in an embodiment, row vectors of a matrix in a final convolution layer of the GCN module 12 will be referred to as $h_g = h_1^g, h_2^g, \ldots, h_n^g$.

In order to perform an MD task and a word-sense disambiguation (WSD) resolving task on the target word, the control module 13 may calculate each entire representation vector and multi-task learning module 14 may feed the entire representation vector to a task-specific classifier to compute the probability distribution for the possible labels for each task and perform knowledge transfer between the first and second encoders using similarity between the MD task and the WSD resolving task.

Further, the control module 13 may regulate the GCN representation vectors to generate an entire representation vector.

Further, the control module 13 may calculate the control vectors by applying an activation function (e.g., a rectified linear unit (ReLU)) to the BiLSTM representation vector of the target word to generate a BiLSTM control vector and a GCN control vector, respectively, applying the BiLSTM control vector and GCN control vector to the BiLSTM representation vectors and the GCN representation vectors via an element-wise multiplication to generate filtered BiLSTM vectors and filtered GCN vectors, respectively, and aggregating the filtered GCN vectors to generate the entire representation vector.

In order for the control module 13 to perform MD on the target word $w_a$, the deep learning model may calculate the entire representation vector V.

In an embodiment, the control module 13 may aggregate the GCN representation vectors $h_g = h_1^g, h_2^g, \ldots, h_n^g$ using pooling (e.g., maximum or average) and attention mechanisms to generate the entire representation vector.

In this case, there is a disadvantage in that all dimensions of the representation vector are assumed to have the same level of importance. Since the dimensions of the representation vector are not yet constrained at all, some dimensions have more impact than the other dimensions for MD. Further, since the BiLSTM and GCN representation vectors are abstracted from the original word vector $x_i$ through the BiLSTM and the GCN, which are hidden layers, information (i.e., a component of an index embedding of $x_i$) about a location of the target word may be ambiguously expressed, which results in confusion of the representation vector for the target word for MD.

In an embodiment, the control module 13 may address the above-described problem by regulating the GCN representation vector to be more specific and aware of the target word $w_a$.

Since the regulation is performed by the control module 13 at a dimension level (i.e., feature-wise), the dimensions may be appropriately quantified depending on their importance for the MD problem.

First, the control module 13 may calculate the control vector on the basis of the representation vector $h_a$ of the target word $w_a$ and then apply the control vector as a feature-wise filter for other representation vectors of the BiLSTM and GCN.

The control module 13 may calculate a BiLSTM control vector $c_h$ with respect to the BiLSTM representation vector $h=h_1, h_2, \ldots, h_n$ using Equation 2 below.

$$c_h = Relu(W_h h_a) \quad \text{[Equation 2]}$$

The control module 13 may filter the word which is less relevant to the target word we in the BiLSTM representation vector $h_i$ by element-wise multiplication using Equation 3 below.

$$\hat{h}_i = c_h \odot h_i \forall 1 \leq i \leq n \quad \text{[Equation 3]}$$

In Equation 3, $\hat{h}_i$ may denote the filtered BiLSTM vector, and the element-wise multiplication may refer to a mechanism for achieving feature-wise and/or dimension-level manipulation of the representation vector.

A GCN control vector $c_g$ may be adjusted by the weighted sum m of the representation vectors in h.

Since information which is already presented in the BiLSTM representation vector h may be transferred to the GCN control vector $c_g$, significant information of the BiLSTM representation vector may remain when the GCN control vector $c_g$ is applied to the GCN representation vector $h_g$.

The control module 13 may use the filtered vectors $\hat{h}_i$ to obtain weights α for the representation vectors in h so that the weights are customized for the target word $w_a$ using Equation 4 below.

[Equation 4]

$$\alpha_i = \frac{\exp(W_\alpha \hat{h}_i)}{\sum_{j=1}^{n} \exp(W_\alpha \hat{h}_j)}$$

$$m = \sum_{i=1}^{n} \alpha_i h_i, \; c_g = Relu(W_g[h_a, m])$$

Next, the control module 13 may apply the GCN control vector $c_g$ to the GCN representation vector $h_i^g$ by element-wise multiplication using Equation 5 below to generate the filtered GCN representation vector $\hat{h}_i^g$.

$$\hat{h}_i^g = c_g \odot h_i^g \quad \text{[Equation 5]}$$

Next, the control module 13 may aggregate the GCN filtered representation vector $\hat{h}_i^g$ using a concatenation vector by Equation 6 below to generate the entire representation vector V for MD.

$$V = [\hat{h}_a^g, \max(\hat{h}_1^g, \hat{h}_2^g, \ldots, \hat{h}_n^g)] \quad \text{[Equation 6]}$$

In Equation 6, $\hat{h}_a^g$ may be used to capture the contextual information about the target word $w_a$, whereas $\max(\hat{h}_1^g, \hat{h}_2^g, \ldots, \hat{h}_n^g)$ may be used to enhance the entire representation vector V by utilizing the most significant contextual information from other words.

The encoder 9 may use the entire representation vector V as an input of a feed-forward neural network (not shown) and, finally, calculate a probability distribution on whether the target word is a metaphorical expression or a non-metaphorical expression using a softmax layer.

In an embodiment, the encoder 9 may use a negative log-likelihood function for a learning dataset as a loss function for training the model.

The multi-task learning module 14 may comprise a task-specific classifier configured to compute a probability distribution for possible labels for each task.

The multi-task learning module 14 may use a multi-task learning framework in which knowledge is transferred between the two tasks using similarity between the WSD resolving and the detection of metaphorical expression.

The first intuition of the multi-tasking learning using the WSD resolving is that the WSD resolving is related to the MD task and detection performance of metaphorical expression may be improved by transferring the knowledge in an inference process of the WSD resolving. In an embodiment, the multi-task learning module 14 may identify an exact meaning of the word and/or expression in context from among the possible meanings that the word may normally have through the WSD resolving.

At the modeling level, the WSD resolving and the MD may perform classification problems on the words and/or expression according to the context of the sentence. At the semantic level, various metaphorical meanings of the word are recorded in WordNet's inventory. For example, a meaning of a word "drown" in the phase "drowned in work" is a metaphor for the word "drown" in the phase "drowned in water."

As a result, when a deep learning system is able to learn an effective representation to distinguish between meanings of the words in the context, representations derived from the system may also aid in detection of metaphorical representation due to close relevance in semantic modeling of the context.

In the present embodiment, by proposing a new multi-task learning framework that matches the derived representations for the WSD resolving and the MD to facilitate knowledge transfer between two tasks based on similarity between the WSD resolving and the MD.

The framework according to the embodiment trains two networks for two tasks so that representations of two networks are made to be similar when the same sentence and/or context is presented, and thus the problem in that the datasets are annotated only for a single task may be explicitly handled. That is, the knowledge in the dataset for the WSD resolving may be transferred by the multi-task learning module 14 and thus performance of the MD task may be improved.

The multi-task learning module 14 may simultaneously address several tasks which are different but relevant to one another using a learning dataset available in multi-tasking learning settings of natural language processing (NLP).

The multi-task learning module 14 may execute an alternative training procedure that replaces the training process used for the associated task when the dataset for the associated task includes different input texts (e.g., when the sentence of the dataset for a task has only a label for the corresponding task).

One task may be selected with a certain probability by one calculation procedure, and the multi-task learning module 14 may sample a mini-batch of the dataset for the corresponding task to calculate a loss and update the model.

Parameters of the first and second encoders 15 and 16 are shared by all the tasks and updated each time the parameters are calculated repeatedly, whereas only the parameters for the classifier 17 of the currently selected task are affected at one learning iteration.

The multi-task learning framework for the WSD resolving and the MD according to the embodiment may correspond to a latter scenario because the datasets available for the two tasks do not share the input sentence.

Therefore, the multi-task learning module 14 may use the alternative training procedure as the baseline of the multi-task learning framework in the corresponding task.

The problem in the baseline approach is that a single deep learning model may be used as an encoder for several associated consideration tasks.

Although there is some degree of similarity between the WSD resolving and the MD in terms of semantic classification of contextual words and/or expressions, the representation vector of the encoder for the WSD resolving may require more minute or detailed information than the MD.

This is caused by the fact that the label of the WSD resolving is generally more specific and thorough than the label of the MD. In particular, one word of the WSD resolving may have ten or more different meanings, whereas a word of the MD may be assigned only to two labels (i.e., metaphorical or non-metaphorical). On the other hand, some metaphorical meanings may not be present in WordNet for the WSD resolving, thus the representation vector for the MD is required to capture semantic information that is potentially different from that of the WSD resolving. As a result, when a single encoder is used to derive the representation vectors for the WSD resolving and the MD, it is difficult for the encoder to determine what semantic information should be focused on, and thus the quality of the representation may be lowered.

The multi-task learning module 14 according to the embodiment may address the above-described problems by using two separate encoders 15 and 16 to calculate the representation vectors for the WSD resolving and the MD, instead of using a single deep learning encoder.

The two encoders 15 and 16 use the network architecture described above, and when the same input sentence is displayed, the two encoders 15 and 16 may generate similar representation vectors so that knowledge may be transferred between the encoders 15 and 16.

Two independent encoder networks may provide flexibility to learn specific features for individual tasks. Further, a knowledge transfer mechanism between the encoders facilitates the integration of information into the WSD resolving for MD.

In an embodiment, $E^{wsd}$ may denote the first encoder 15 applied to the WSD resolving and $E^{md}$ may denote the second encoder 16 applied to the MD.

Further, $(w^t, p^t, y^t)$ may denote an example of the dataset for the WSD resolving or the MD where t (t∈{wsd, md}) may denote a task indicator. In the dataset, $w^t$ may denote the input sentence, $p^t$ may denote the location of the target word, and $y^t$ may denote the label of the word $w^t$ for the task t.

The multi-task learning module 14 may feed the input text $(w^t, p^t)$ to both of the encoders $E^{wsd}$ and $E^{md}$ using Equation 7 below in order to perform knowledge transfer and thus may generate an entire representation vector $V^{wsd}$ of the WSD resolving and an entire representation vector $V^{md}$ of the MD.

$$V^{wsd}=E^{wsd}(w^t,p^t), V^{md}=E^{md}(w^t,p^t) \qquad \text{[Equation 7]}$$

For the task t, a representation vector $V^t$ may be transmitted to a task-specific classifier 17 Ft (e.g., a feed-forward neural network followed by a next softmax layer) in order to calculate a probability distribution $P^t(.|w^t, p^t)$ for possible labels for t.

The multi-task learning module 14 may update parameters of the task-specific classifier 17 $F^t$ and the first and second encoders $E^{wsd}$ and $E^{md}$ by minimizing a subsequent loss function using Equation 8 below.

$$C(w^t,p^t,y^t)=-\log P^t(y^t|w^t,p^t)+\lambda\|V^{wsd}-V^{md}\|_2^2 \qquad \text{[Equation 8]}$$

In Equation 8, λ may denote a trade-off parameter. The rationale of the second term is that $V^{wsd}$ and $V^{md}$ should be similar because $V^{wsd}$ and $V^{md}$ denote representation vectors for the same input sentence $w^t$ of the first and second encoders $E^{wsd}$ and $E^{md}$.

Two encoders may communicate with each other so that knowledge from one task (e.g., the WSD resolving) may be transferred to another task (e.g., the MD) to improve the quality of the representation vector.

Further, the alternative training process may also be used to train the system 10.

Figure 4:
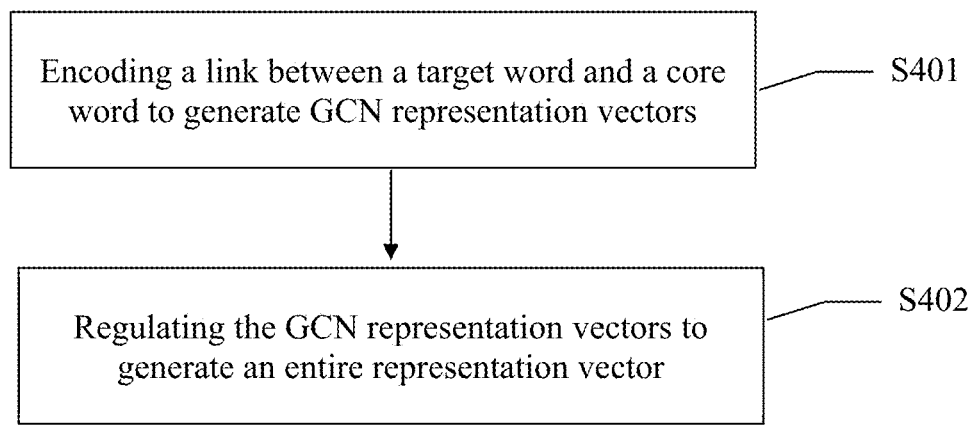
FIG. 4 is a flowchart of a method for metaphor detection in natural language processing according to an embodiment.

FIG. 4 is a flowchart of a method for metaphor detection in natural language processing according to an embodiment. A graph convolutional neural network (GCN) module 12 may encode a link between a target word and a core word to generate GCN representation vectors by feeding BiLSTM representation vectors into a graph convolutional neural network (GCN) structured to compute over the dependency tree of the input sentence (S401). A control module 13 may regulate the GCN representation vectors to generate an entire representation vector by applying an activation function (e.g., a rectified linear unit (ReLU)) to the BiLSTM representation vector of the target word to generate a BiLSTM control vector and a GCN control vector, respectively; applying the BiLSTM control vector and the GCN control vector to the BiLSTM representation vectors and the GCN representation vectors via an element-wise multiplication to generate filtered BiLSTM vectors and filtered GCN vectors, respectively; and aggregating the filtered GCN vectors to generate the entire representation vector (S402).

The method may further comprise inputting the entire representation vector into a feed-forward neural network and calculating a probability distribution on whether the target word is a metaphorical expression or a non-metaphorical expression using a softmax layer, wherein a loss function for training the model is a negative log-likelihood function for a learning dataset.

Figure 5:
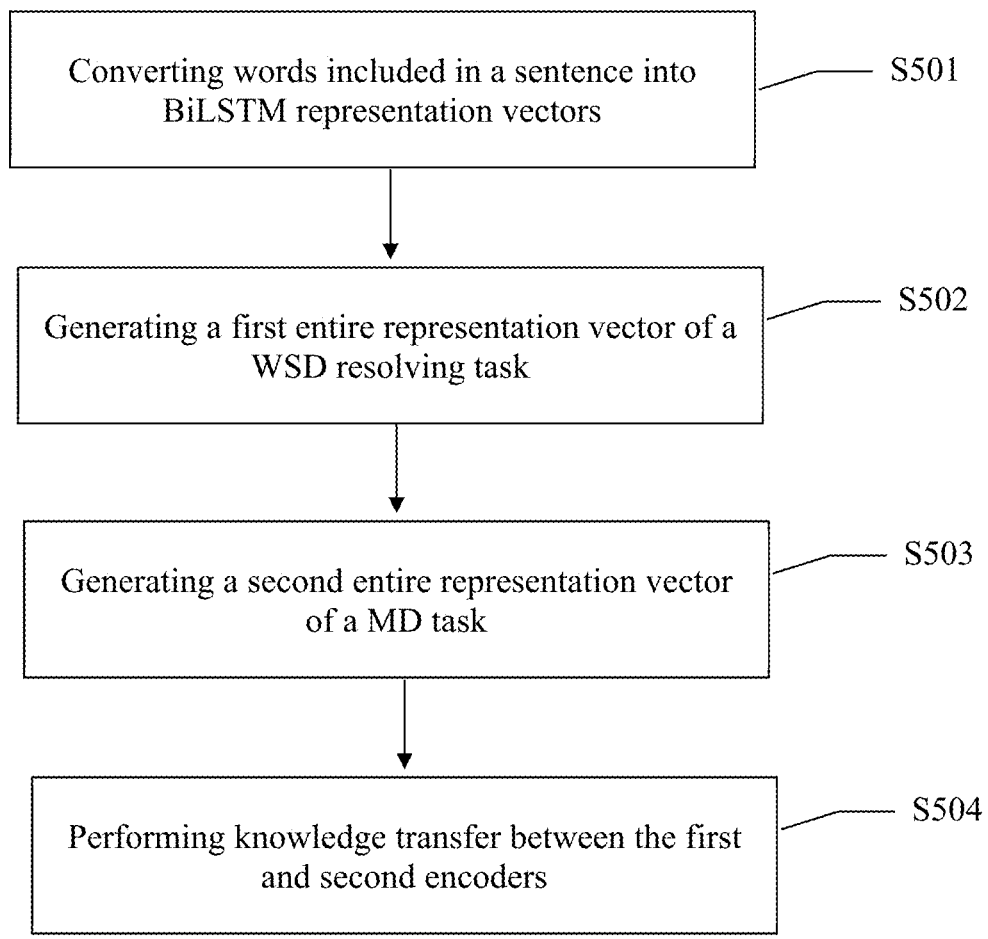
FIG. 5 is a flowchart of a method for metaphor detection in natural language processing according to an embodiment.

FIG. 5 is a flowchart of a method for metaphor detection in natural language processing according to an embodiment. The encoding module 11 may convert words included in a sentence into BiLSTM representation vectors by concatenating vectors calculated by using an uncontextualized pre-trained word embedding, a contextualized word embedding, and an index embedding into a concatenated vector, and executing a BiLSTM network over the said concatenated vector to generate the BiLSTM representation vectors (S501). A first encoder 15 may generate a first entire representation vector of a WSD resolving task (S502). A second encoder 16 may generate a second entire representation vector of an MD task (S503). The first and second encoders 15 and 16 may perform the method as described in FIG. 4. A multi-task learning module 14 may perform knowledge transfer between the first and second encoders 15 and 16. The task-specific classifier 17 may compute a probability distribution for possible labels for each task. The multi-task learning module 14 may minimize the following loss function:

$$C(w^t, p^t, y^t) = -\log P^t(y^t|w^t, p^t) + \lambda \|V^{wsd} - V^{md}\|_2^2$$

in order to update parameters to the task-specific classifier 17 and the first and second encoders 15 and 16 (S504).

In the experiment according to Table 1 below, using the above-described dataset, performance of various MD models compares with performance of the system for metaphor detection in natural language processing according to the embodiment.

each sentence in MOH-X. Finally, TroFi involves sentences from the 1987-89 Wall Street Journal Corpus Release 1. Similar to MOHX, TroFi is also only annotated for a single target verb. Following the settings in the prior art, 10-fold cross validation on MOH-X and TroFi is performed and the VUA datasets are split into training, validation and test sets. The same data splits are used for all the three datasets as the prior art for the fair comparison. The Semcor dataset is used for the WSD dataset in this invention. This dataset includes sentences whose words have been manually annotated for theWordNet sense ids. As the number of words in Semcor is

TABLE 1

| Model | VUA All POS | | | | VUA VERB | | | | MOH-X | | | | Tro-Fi | | | |
|---|---|---|---|---|---|---|---|---|---|---|---|---|---|---|---|---|
| | P | R | F1 | Acc | P | R | F1 | Acc | P | R | F1 | Acc | P | R | F1 | Acc |
| Lexical Baseline | — | — | — | — | 67.9 | 40.7 | 50.9 | 76.4 | 39.1 | 26.7 | 31.3 | 43.6 | 72.4 | 55.7 | 62.9 | 71.4 |
| SimNet | — | — | — | — | — | — | — | — | 73.6 | 76.1 | 74.2 | 74.8 | — | — | — | — |
| CNN + BiLSTM† | 60.8 | 70.0 | 65.1 | — | 60.0 | 76.3 | 67.2 | — | — | — | — | — | — | — | — | — |
| RNN_CLS | — | — | — | — | 53.4 | 65.6 | 58.9 | 69.1 | 75.3 | 84.3 | 79.1 | 78.5 | 68.7 | 74.6 | 72.0 | 73.7 |
| RNN_SEQ_ELMo† | 71.6 | 73.6 | 72.6 | 93.1 | 68.2 | 71.3 | 69.7 | 81.4 | 79.1 | 73.5 | 75.6 | 77.2 | 70.7 | 71.6 | 71.1 | 74.6 |
| RNN_SEQ_BERT† | 71.5 | 71.9 | 71.7 | 92.9 | 66.7 | 71.5 | 69.0 | 80.7 | 75.1 | 81.8 | 78.2 | 78.1 | 70.3 | 67.1 | 68.7 | 734 |
| RNN_HG† | 71.8 | 76.3 | 74.0 | 93.6 | 69.3 | 72.3 | 70.8 | 82.1 | 79.7 | 79.8 | 79.8 | 79.7 | 67.4 | 77.8 | 72.2 | 74.9 |
| RNN_MHCA† | 73.0 | 75.7 | 74.3 | 93.8 | 66.3 | 75.2 | 70.5 | 81.8 | 77.5 | 83.1 | 80.0 | 79.8 | 68.6 | 76.8 | 72.4 | 75.2 |
| MUL_GCN | 74.8 | 75.5 | 75.1 | 93.8 | 72.5 | 70.9 | 71.7 | 83.2 | 79.7 | 80.5 | 79.9 | 79.9 | 73.1 | 73.6 | 73.2 | 76.4 |

Referring to Table 1, MUL_GCN refers to the system for metaphor detection in natural language processing according to the embodiment, and Lexical Baseline, SimNet, CNN+BiLSTM, RNN CLS, RNN SEQ ELMo, RNN SEQ BERT, RNN HG, and RNN MHCA refer to the conventional system for metaphor detection in natural language processing according to comparative examples.

Lexical Baseline is a simple system based on the metaphorical frequency of the words (Gao et al. 2018). SimNet is the neural similarity networks using skip-gram word embeddings in (Rei et al. 2017). CNN+BiLSTM is the ensemble model with Convolutional Neural Networks (CNN) and BiLSTM in (Wu et al. 2018). RNN CLS is the BiLSTM model with attention in (Gao et al. 2018) for the classification setting. RNN SEQ ELMo is the BiLSTM model in (Gao et al. 2018) for the sequential prediction setting. And RNN SEQ BERT (reported in (Mao, Lin, and Guerin 2019)) is similar to RNN SEQ ELMo except that the ELMo embeddings are replaced by the BERT embeddings (Devlin et al. 2019). RNN HG is the BiLSTM model based on the MIP principle in (Mao, Lin, and Guerin 2019). RNN MHCA is the BiLSTM model with contextual attention and the SPV principle in (Mao, Lin, and Guerin 2019).

Further, referring to Table 1, in the present experiment, in order to be compatible with the previous technology, the operation of the metaphorical expression detection was performed using three types of datasets, VU Amsterdam Metaphor Corpus (VUA), MOH-X, and Trope Finder (TroFi), which are used for MD.

VUA represents the largest public evaluation dataset for metaphor detection that is used by the NAACL-2018 Metaphor Shared Task. The annotation for this dataset is based on MIP for which every word in the sentences is labeled for metaphor identification. Following the prior art, two versions of this dataset are also considered, i.e., VUA ALL POS where words of all types (e.g., nouns, verbs, adjectives) are labeled, and VUA VERB that only focuses on the verbs for metaphor detection. For MOH-X, the sentences are shorter and simpler than those in the other datasets as they are sampled from WordNet. Only one single verb is labeled in much larger than those in the datasets for metaphor detection, only a portion of Semcor is sampled to train the models in this invention.

In particular, the sampling is performed so that the numbers of examples in the WSD and metaphor detection datasets would be similar. For the metaphor detection datasets that only involve verbs as the targets (i.e., VUA VERB, MOH-X, TroFi), only the verbs in Semcor are also sampled for WSD accordingly. Regarding the pre-trained word embeddings. The 300 d Glove vectors and 1024 d ELMo vectors are also used as in (Gao et al. 2018; Mao, Lin, and Guerin 2019). The dimension of the index embeddings is set to 50 as in the classification setting in for a fair comparison. The other hyper-parameters of the proposed model for each dataset are fine-tuned, resulting in the parameter values as follow. The numbers of hidden units for the BiLSTM networks and the GCN networks are both 200 while the number of the GCN layers is set to 2. The models are trained with shuffled minibatches of size 32, using the Adam optimizer to update the parameters. The trade-off parameter λ for multi-task learning in Equation 4 for VUA ALL POS, VUA VERB, MOH-X and TroFi are all set to 1.

Table 1 presents the performance where F1 is the most important measure for this task.

There are two different settings/approaches to do metaphor detection in the literature, i.e., the sequential labeling setting and the classification setting. In the sequential labeling setting, the models are trained to predict a sequence of binary labels to indicate the metaphoricity of the words in the sentences (i.e., the models with t in Table 1) while the classification setting determines the metaphorcity of the words in the sentences independently as a word classification problem (i.e., the way metaphor detection is modeled in this invention). On the one hand, Table 1 shows that among the model with the classification setting, the proposed model significantly outperform the previous state-ofthe-art model (i.e., RNN CLS). The performance gap is significant and substantial with respect to VUA VERB and TroFi. On the other hand, comparing the previous sequential labeling models with the proposed model MUL GCN, it can be seen that MUL GCN also has significantly better F1 score than the previous models (e.g., the current state-of the-art system RNN MHCA) on three over four considered datasets (p<0.01). The only exception is on the MOHX dataset where MUL GCN achieves comparable performance with RNN MHCA. Such evidences clearly help to demonstrate the advantages of the proposed model over the ones in the prior art. One interesting point is predicting the metaphor labels of the context words (as in the sequential labeling setting) is suggested by the prior art as the better way to do metaphor detection than the classification setting. However, in this invention, the contrary that the classification setting can still produce metaphor detection models with the state-of-the-art performance is shown. Such an achievement is attributed to the proposal of multi-task learning, the control mechanism and the GCNs that helps to boost the performance of the model in this invention significantly.

The main components of the neural network model in this invention include the BiLSTM model in the encoding module, the GCN module and the control module. This section evaluates the effectiveness of such components when they are removed from the whole model. For the GCN module, the model when the GCN module is replaced by the popular multihead self-attention layer from Transformer is additionally evaluated to demonstrate the necessity of GCNs in this invention. Similar to the prior art, the VUA VERB dataset is used for such ablation studies. Table 2 shows the performance of the models in the test datasets of VUA VERB.

TABLE 2

| Model | P | R | F1 | Acc |
| --- | --- | --- | --- | --- |
| MUL_GCN | 72.5 | 70.9 | 71.7 | 83.2 |
| MUL_GCN - BiLSTM Layer | 65.9 | 69.3 | 67.6 | 80.0 |
| MUL_GCN - Control Module | 69.0 | 67.6 | 68.3 | 81.2 |
| MUL_GCN - GCN Module | 74.6 | 60.9 | 67.0 | 82.0 |
| Replace GCN with Self-Attention | 72.6 | 67.4 | 69.9 | 82.6 |

As shown from the table 2, each component (i.e., BiLSTM, Control and GCN modules) is important for the proposed model MUL GCN as excluding any of them would hurt the performance significantly. The replacement of GCN with self-attention also worsens the model substantially that helps to further testify to the benefit of GCNs for selecting the appropriate context words for representation learning in metaphor detection.

Another important module in this invention is the multi-task learning framework between WSD and metaphor learning. In order to demonstrate the effectiveness of this module for metaphor detection, this section evaluates the following baseline techniques to train the models: (1) Single Network: only a single network for metaphor detection is trained (i.e., completely ignoring the network for WSD), (2) Pretraining: a single network is trained on the WSD dataset first and then retrained on the metaphor dataset later, and (3) Alternative: a single model is trained for both WSD and metaphor detection, following the alternative training procedure. Table 3 shows the performance of the methods on the VUA VERB test set.

TABLE 3

| Method | P | R | F1 | Acc |
| --- | --- | --- | --- | --- |
| Mul_GCN (proposed) | 72.5 | 70.9 | 71.7 | 83.2 |
| Single Network | 69.7 | 68.1 | 68.9 | 81.5 |
| Pre-training | 70.8 | 68.5 | 69.6 | 82.1 |
| Alternative | 72.9 | 65.4 | 69.0 | 82.3 |

As shown from the table 3, the multi-task learning framework can significantly improve the Single Network method with substantially better F1 score. This demonstrates the benefit of WSD for metaphor detection. It is also evident that the proposed method Mul GCN significantly outperforms the multi-task learning baselines by large margin on the F1 score (i.e., up to 2.7% improvement over the absolute F1), thereby corroborating the advantages of the multi-task learning mechanism in this invention for metaphor detection.

In order to achieve the similarity of the two vectors $V^{wsd}$ and $V^{md}$ in the multi-task module (i.e., Equation 8), the proposed model employs the mean squared error (MSE) as the measure of dissimilarity to be minimized via the overall loss function as following:

$$M = \|V^{wsd} - V^{md}\|_2^2$$

In practice, there are several alternative dissimilarity measures M that can be added into the loss function for this purpose.

In this section, the following dissimilarity measures M for knowledge transferring in the multi-task learning module are additionally investigated to better understand the effect of such measure choices for the model in this invention as:

Kullback-Leibler divergence (KL):

$$M = KL(S^{wsd}, S^{md}) = -\sum_i S_i^{wsd} \log \frac{S_i^{wsd}}{S_i^{md}}$$

(where $S^{wsd}$=softmax($V^{wsd}$) and $S^{md}$=softmax($V^{md}$))

Cosine (Cosine):

$$M = 1 - \cos(V^{wsd}, V^{md})$$

The Margin Loss (Margin):

$$M = 1 - s_{wsd} + s_{md}$$

(where $S^{wsd}$=sigmoid(FF($V^{wsd}$)) and $S^{md}$=sigmoid(FF($V^{md}$)) with FF as a feed-forward function to transform the vectors $V^{wsd}$ and $V^{md}$ into scalars)

Table 4 reports the performance of such dissimilarity measures on the VUA VERB test set when they are used in the proposed model (i.e., replacing the MSE measure). It is clear from the table that the MSE is significantly better than the other dissimilarity measures for the model, justifying for our choice of MSE in this invention.

TABLE 4

| Measure | P | R | F1 | Acc |
| --- | --- | --- | --- | --- |
| MSE (proposed) | 72.5 | 70.9 | 71.7 | 83.2 |
| KL | 73.8 | 66.0 | 69.7 | 82.8 |
| Cosine | 71.5 | 65.5 | 68.4 | 81.8 |
| Margin | 72.6 | 64.4 | 68.3 | 82.0 |

According to the embodiment, there is a technical effect that a hidden vector may be generated using a word embedding technique and BiLSTM and the hidden vector may be input to the GCN structured to compute over a dependency parsing tree to generate GCN representation vector.

Further, there is a technical effect in which a target word for MD in text may be more specifically recognized by regulating the GCN representation vector at a feature and/or dimensional level.

Further, there is a technical effect that, in order to improve similarity between representation vectors of a dual network in the same sentence, two encoders for the MD and the WSD resolving may be used to independently perform the WSD resolving and the MD.

According to the present invention, in the system and method for metaphor detection in natural language processing, metaphorical expressions and words can be identified in text.

Further, deep learning can be used to detect a metaphorical expression with high accuracy.

Further, a new mechanism can be provided to improve performance of a deep learning model for detection of metaphorical expression.

While the present invention has been described with reference to the exemplary embodiments of the present invention, it will be understood by those skilled in the art that various changes and modifications may be made without departing from the spirit and scope of the present invention as defined by the appended claims.

What is claimed is:

1. An encoder for metaphor detection in natural language processing (NLP) comprising:
a graph convolutional neural network (GCN) module configured to encode a link between a target word and a core word to generate GCN representation vectors, wherein the GCN module feeds BiLSTM representation vectors into a graph convolutional neural network (GCN) structured to compute over a dependency tree of an input sentence; and
a control module configured to regulate the GCN representation vectors to generate an entire representation vector, wherein the control module is configured to:
apply an activation function (e.g., a rectified linear unit (ReLU)) to the BiLSTM representation vector of the target word to generate a BiLSTM control vector and a GCN control vector, respectively;
apply the BiLSTM control vector and the GCN control vector to the BiLSTM representation vectors and the GCN representation vectors via an element-wise multiplication to generate filtered BiLSTM vectors and filtered GCN vectors, respectively; and
aggregate the filtered GCN vectors to generate the entire representation vector.

2. The encoder of claim 1, further including:
a feed-forward neural network using the entire representation vector as an input and calculating a probability distribution on whether the target word is a metaphorical expression or a non-metaphorical expression using a softmax layer,
wherein a loss function for training is a negative log-likelihood function for a learning dataset.

3. A system for metaphor detection in natural language processing comprising:
an encoding module configured to convert words included in a sentence into BiLSTM representation vectors;
a first encoder configured to generate a first entire representation vector of a WSD resolving task;
a second encoder configured to generate a second entire representation vector of an MD task, wherein the first and second encoders have the same network architecture as the encoder of claim 1; and
a multi-task learning module configured to perform knowledge transfer between the first and second encoders.

4. The system of claim 3, wherein the encoding module, in order to convert the words included in the sentence into the BiLSTM representation vectors,
concatenates vectors calculated by using an uncontextualized pre-trained word embedding, a contextualized word embedding, and an index embedding into a concatenated vector; and
executes a BiLSTM network over the said concatenated vector to generate the BiLSTM representation vectors.

5. The system of claim 3, wherein the multi-task learning module comprises a task-specific classifier configured to compute a probability distribution for possible labels for each task.

6. The system according to claim 5, wherein the multi-task learning module minimizes the following loss function:

$$C(w^t, p^t, y^t) = -\log P^t(y^t | w^t, p^t) + \lambda \| V^{wsd} - V^{md} \|_2^2$$

in order to update parameters to the task-specific classifier and the first and second encoders.

7. The system of claim 3, wherein an alternative training process is used to train the system.

8. A method for metaphor detection in natural language processing, the method comprising:
encoding, by a graph convolutional neural network (GCN) module, a link between a target word and a core word to generate GCN representation vectors, wherein the encoding the link between the target word and the core word comprises feeding BiLSTM representation vectors into a graph convolutional neural network (GCN) structured to compute over a dependency tree of an input sentence; and
regulating, by a control module, the GCN representation vectors to generate an entire representation vector, wherein the regulating the GCN representation vectors comprises:
applying an activation function (e.g., a rectified linear unit (ReLU)) to the BiLSTM representation vector of the target word to generate a BiLSTM control vector and a GCN control vector, respectively;
applying the BiLSTM control vector and the GCN control vector to the BiLSTM representation vectors and GCN representation vectors via an element-wise multiplication to generate filtered BiLSTM vectors and filtered GCN vectors, respectively; and
aggregating the filtered GCN vectors to generate the entire representation vector.

9. The method of claim 8, further including:
inputting the entire representation vector into a feed-forward neural network and calculating a probability distribution on whether the target word is a metaphorical expression or a non-metaphorical expression using a softmax layer,
wherein a loss function for training is a negative log-likelihood function for a learning dataset.

10. A method for metaphor detection in natural language processing comprising:
converting, by an encoding module, words included in a sentence into BiLSTM representation vectors;
generating, by a first encoder, a first entire representation vector of a WSD resolving task;
generating, by a second encoder, a second entire representation vector of an MD task, wherein the first and second encoders are configured to perform the method of claim 8; and performing, by a multi-task learning module, knowledge transfer between the first and second encoders.

11. The method of claim 10, wherein the converting the words included in the sentence into the BiLSTM representation vectors comprises:
concatenating vectors calculated by using an uncontextualized pre-trained word embedding, a contextualized word embedding, and an index embedding into a concatenated vector; and
executing a BiLSTM network over the said concatenated vector to generate the BiLSTM representation vectors.

12. The method of claim 10, wherein the performing knowledge transfer between the first and second encoders comprises computing, by a task-specific classifier, a probability distribution for possible labels for each task.

13. The method according to claim 12, wherein the performing knowledge transfer between the first and second encoders comprises minimizing, by the multi-task learning module, the following loss function:

$$C(w^t, p^t, y^t) = -\log P^t(y^t|w^t, p^t) + \lambda \|V^{wsd} - V^{md}\|_2^2$$

in order to update parameters to the task-specific classifier and the first and second encoders.

14. The method of claim 10, wherein the method uses an alternative training process for training.

* * * * *

UNITED STATES PATENT AND TRADEMARK OFFICE
CERTIFICATE OF CORRECTION

| | |
|---|---|
| PATENT NO. | : 11,625,540 B2 |
| APPLICATION NO. | : 17/160103 |
| DATED | : April 11, 2023 |
| INVENTOR(S) | : Hung Hai Bui et al. |

It is certified that error appears in the above-identified patent and that said Letters Patent is hereby corrected as shown below:

On the Title Page

Item (72) "Inventors:" field, "Hung Hai Bui, Ha Noi (VN); Thien Huu Nguyen, Ha Noi (VN); Duong Minh Le, Ha Noi (VN)" should be corrected to -- Hung Hai Bui, Ha Noi (VN); Thien Huu Nguyen, Ha Noi (VN); Duong Minh Le, Ha Noi (VN); Dinh Quoc Phung, Ha Noi (VN) --

Signed and Sealed this
Sixth Day of June, 2023

Katherine Kelly Vidal
*Director of the United States Patent and Trademark Office*